United States Patent
Matsuda

(10) Patent No.: US 9,671,878 B2
(45) Date of Patent: Jun. 6, 2017

(54) MOBILE TERMINAL AND CURSOR DISPLAY CONTROL METHOD

(71) Applicant: KYOCERA Corporation, Kyoto-shi, Kyoto (JP)

(72) Inventor: Munehito Matsuda, Neyagawa (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/654,478

(22) PCT Filed: Dec. 20, 2013

(86) PCT No.: PCT/JP2013/084187
§ 371 (c)(1),
(2) Date: Jun. 19, 2015

(87) PCT Pub. No.: WO2014/098206
PCT Pub. Date: Jun. 26, 2014

(65) Prior Publication Data
US 2015/0355735 A1     Dec. 10, 2015

(30) Foreign Application Priority Data

Dec. 21, 2012   (JP) ................. 2012-278951

(51) Int. Cl.
*G09G 5/08* (2006.01)
*G06F 3/0488* (2013.01)
(Continued)

(52) U.S. Cl.
CPC ........ *G06F 3/03547* (2013.01); *G06F 3/0488* (2013.01); *G06F 3/04817* (2013.01);
(Continued)

(58) Field of Classification Search
None
See application file for complete search history.

(56) References Cited

U.S. PATENT DOCUMENTS 6,014,127 A *  1/2000  Blomqvist .............. G06T 19/20
                                                   715/856
7,304,638 B2 * 12/2007  Murphy .................. G06F 3/041
                                                   178/18.01
(Continued)

FOREIGN PATENT DOCUMENTS

JP     H5-313625 A    11/1993
JP     2005-165590 A   6/2005
(Continued)

OTHER PUBLICATIONS

International Search Report dated Feb. 4, 2014, issued for International Application No. PCT/JP2013/084187.

*Primary Examiner* — Dismery Mercedes
(74) *Attorney, Agent, or Firm* — Procopio Cory Hargreaves and Savitch LLP

(57) ABSTRACT

A mobile phone comprises a display provided with a touch panel, etc. When an end portion of the touch panel is touched, a touch icon that indicates a touch position is displayed. Furthermore, if a distance between the touch position and the end portion of the touch panel becomes larger than a first threshold value, a cursor is displayed based on the touch position. This cursor moves if a touch position changes with a touch operation. At this time, if a moving amount of the cursor is large, an afterimage object that indicates the last position (locus) of the cursor is displayed. On the other hand, a moving amount of the cursor is small, the above-described afterimage object is not displayed.

9 Claims, 9 Drawing Sheets

(51) Int. Cl.
  *G06F 3/0481* (2013.01)
  *G06F 3/041* (2006.01)
  *G06F 3/0354* (2013.01)
(52) U.S. Cl.
  CPC ..... *G09G 5/08* (2013.01); *G06F 2203/04801* (2013.01); *G06F 2203/04804* (2013.01); *G09G 2310/04* (2013.01); *G09G 2354/00* (2013.01)

(56) References Cited

U.S. PATENT DOCUMENTS

| | | | | |
|---|---|---|---|---|
| 7,489,306 B2* | 2/2009 | Kolmykov-Zotov | | G06F 3/04812 345/173 |
| 8,274,482 B2* | 9/2012 | Kim | ...................... | G06F 3/0488 178/18.01 |
| 8,643,616 B1* | 2/2014 | Zhang | ................... | G06F 3/0488 345/173 |
| 8,669,937 B2* | 3/2014 | Tashiro | ................... | G06F 3/038 345/156 |
| 8,760,410 B2* | 6/2014 | Yoo | ....................... | G06F 3/0481 345/173 |
| 2008/0163053 A1* | 7/2008 | Hwang | ............... | G06F 3/04886 715/702 |
| 2009/0207144 A1* | 8/2009 | Bridger | ................. | G06F 3/0488 345/173 |
| 2010/0100849 A1* | 4/2010 | Fram | ..................... | G06F 3/0236 715/835 |
| 2010/0153888 A1* | 6/2010 | Jarosz | ................. | G06F 17/5068 715/856 |
| 2011/0074694 A1* | 3/2011 | Rapp | .................... | G06F 3/04845 345/173 |
| 2011/0163988 A1* | 7/2011 | Senda | ................. | G06F 3/04812 345/173 |
| 2012/0056730 A1* | 3/2012 | Ujiie | ................... | G06F 3/03547 340/12.22 |
| 2012/0256857 A1* | 10/2012 | Mak | ...................... | G06F 3/0488 345/173 |

FOREIGN PATENT DOCUMENTS

| | | |
|---|---|---|
| JP | 2009-205556 A | 9/2009 |
| JP | 2011-65422 A | 3/2011 |

* cited by examiner

DISPLAY POSITION TABLE

| NUMBER | DISPLAY POSITION | DISTANCE |
|---|---|---|
| 1 | (x1, y1) | L1 |
| 2 | (x2, y2) | L2 |
| 3 | (x3, y3) | L3 |
| ⋮ | ⋮ | ⋮ |
| n | (xn, yn) | Ln |
| ⋮ | ⋮ | ⋮ |

MOBILE TERMINAL AND CURSOR DISPLAY CONTROL METHOD

CROSS REFERENCE OF RELATED APPLICATION

The disclosure of Japanese patent application No. 2012-278951 filed on Dec. 21, 2012 is incorporated herein by reference in its entirety.

FIELD

The present disclosure relates to a mobile terminal and a cursor display control method, more specifically, a mobile terminal having a touch panel, and a cursor display control method.

BACKGROUND

A mobile terminal device that is an example of a background art has a pointing device for moving a cursor that is displayed on a display screen. A user can input a character using this pointing device.

SUMMARY

For example, when displaying a cursor as in the above-described mobile terminal device, in order not to lose sight of a position of the cursor, an image showing a locus of the cursor may be displayed.

Furthermore, when using an electrostatic capacity type touch panel as a pointing device of a mobile terminal device, in order to improve a reaction to a touch operation, responsivity of the touch panel is set high. In this case, the touch panel with high responsivity may detect a slight motion of a finger even if a user does not have an intention to move the finger, and therefore, a cursor may move slightly against a user's intention.

Then, as described above, if the cursor moves in response to a slight motion of a finger when setting to display a locus of the cursor is performed, an image showing the locus of the cursor is displayed around the cursor, and therefore, it becomes hard for the user to recognize the cursor position.

A first aspect of the present disclosure is a mobile terminal having a touch panel and a display module that is provided with the touch panel, and displays a cursor that moves according to a touch operation, comprising: a calculation module operable to calculate, when a touch position is changed, a display position of the cursor based on the touch position after change; a storing module operable to store the display position calculated by the calculation module; an update module operable to update display of the cursor based on the display position calculated by the calculation module; a distance determination module operable to determine, when the touch position is changed, whether a distance between a last display position that is stored by the storing module and a current display position is larger than a threshold value; and a display module operable to display, when it is determined that the distance between the last display position and the current display position is larger than the threshold value, an object that indicates a last position of the cursor at the last display position, wherein the display module operable not to display the object when it is not determined that the distance between the last display position and the current display position is larger than the threshold value.

A second aspect of the present disclosure is a cursor display control method in a mobile terminal having a touch panel and a display module that is provided with the touch panel, and displays a cursor that moves according to a touch operation, wherein a processor(s) of the mobile terminal performs: calculating, when a touch position is changed, a display position of the cursor based on the touch position after change; storing the display position calculated by the calculating step; updating display of the cursor based on the display position calculated in the calculating step; determining, when the touch position is changed, whether a distance between a last display position that is stored in the storing step and a current display position is larger than a threshold value; and displaying, when it is determined that the distance between the last display position and the current display position is larger than the threshold value, an object that indicates a last position of the cursor at the last display position, wherein the displaying step does not display the object when it is not determined that the distance between the last display position and the current display position is larger than the threshold value.

The above described objects and other objects, features, aspects and advantages of the invention will become more apparent from the following detailed description of the invention when taken in conjunction with the accompanying drawings.

DETAILED DESCRIPTION

Forms for Embodying the Invention

Figure 1:
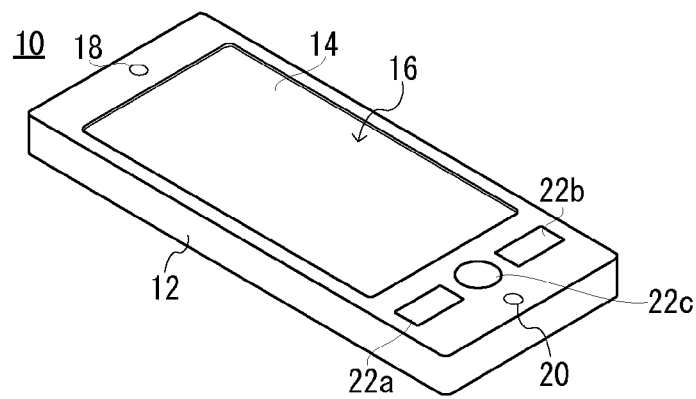
FIG. 1 an appearance view showing a mobile phone according to an embodiment of the present disclosure.

With referring to FIG. 1, a mobile phone 10 of an embodiment according to the present disclosure may be a smartphone as an example, and may include a longitudinal flat rectangular housing 12. However, it is pointed out in advance that the present disclosure can be applied to an arbitrary mobile terminal such as a tablet terminal, a PDA, etc.

A display 14 that can functions as a display module and may be a liquid crystal, organic EL or the like may be provided on one main surface (front surface) of the housing 12. A touch panel 16 may be provided on the display 14. Therefore, in the mobile phone 10 of this embodiment, the most part of an input operation excepting an input by an operation of a hardware key described later can be performed through the touch panel 16.

A speaker 18 may be housed in the housing 12 in one end portion of a longitudinal direction on a side of the main surface, and a microphone 20 may be housed in the other end portion in the longitudinal direction on the side of the main surface.

As hardware keys that can constitute an input operating module together with the touch panel 16, a call key 22a, an end key 22b and a home key 22c may be provided on the main surface of the housing 12, in this embodiment.

For example, a user can input a telephone number by performing a touch operation by the touch panel 16 to a dial key being displayed on the display 14, and start a telephone conversation by operating the call key 22a. If the end key 22b is operated, the telephone conversation can be ended.

Furthermore, when there is an incoming call, a user may be notified of the incoming call by display of the display 14, vibration of a vibrator 50 (see FIG. 2), a ringer tone from the speaker 18, etc. If the call key 22a is operated in such a state of the incoming call, the user can start a telephone conversation.

By long-depressing the end key 22b, it is possible to turn on/off a power supply of the mobile phone 10.

If a user operates the home key 22c, a home screen (see FIG. 3) may be displayed on the display 14. By performing a touch operation by the touch panel 16 to a function icon currently displayed on the display 14 in that state, the user can perform processing relevant to the function icon. Here, "processing relevant to a function icon" in this embodiment may include processing of an application, processing of shifting to a menu screen, etc.

Furthermore, the mobile phone 10 may have an address book function, an e-mail function, a browser function, etc. in addition to the telephone function.

Figure 2:
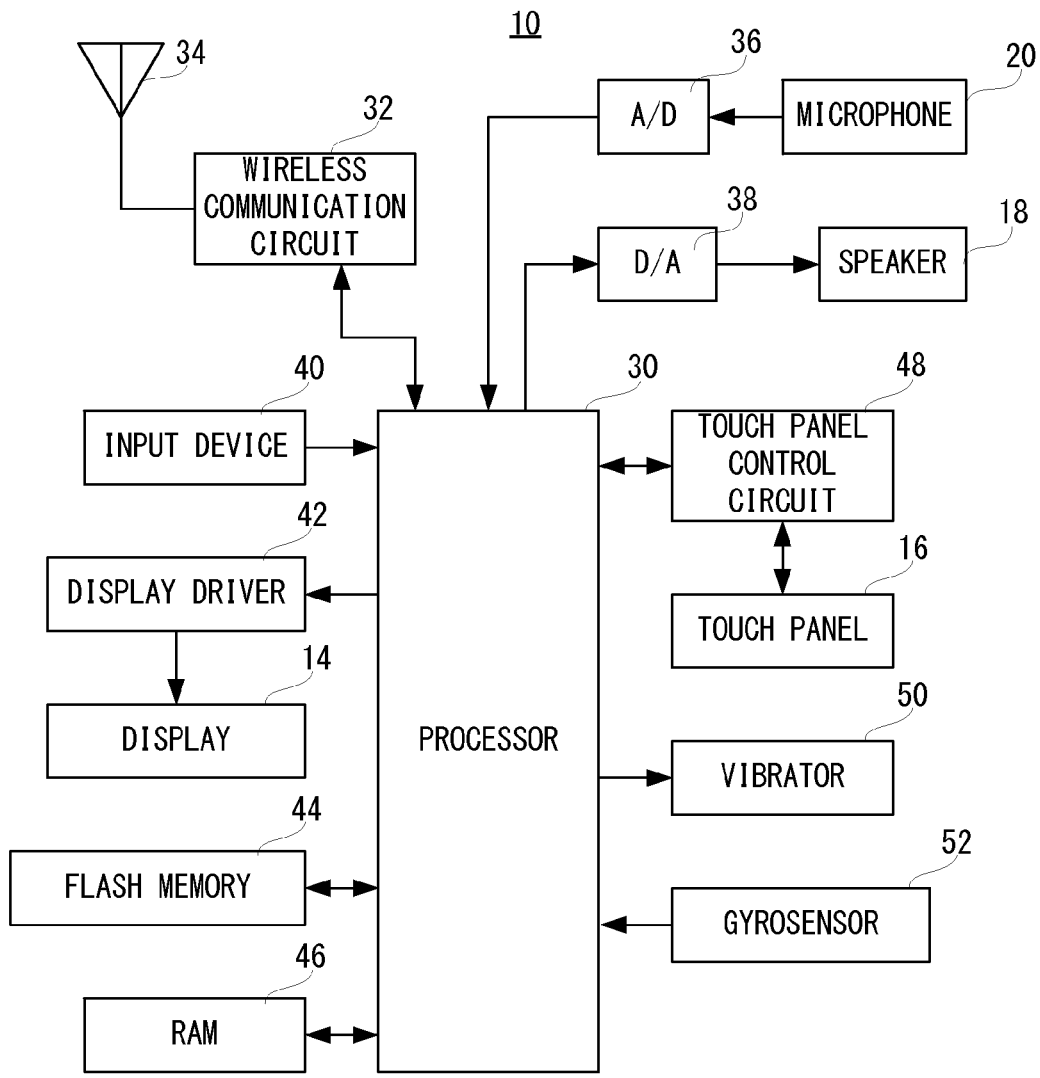
FIG. 2 is an illustration view showing electric structure of the mobile phone shown in FIG. 1.

With referring to FIG. 2, the mobile phone 10 of the embodiment shown in FIG. 1 may include a processor 30 that may be called a computer or CPU, etc. The processor 30 may be connected with a wireless communication circuit 32, an A/D converter 36, a D/A converter 38, an input device 40, a display driver 42, a flash memory 44, a RAM 46, a touch panel control circuit 48, a vibrator 50, a gyro sensor 52, etc.

The processor 30 may be in charge of entire control of the mobile phone 10. A whole or part of a program set in advance in the flash memory 44 may be, in use, developed or loaded into the RAM 46, and the processor 30 can operate in accordance with the program developed in the RAM 46. The RAM 46 may be further used as a working area or buffer area for the processor 30.

The input device 40 may include the hardware keys 22 shown in FIG. 1, and therefore, constitute an operation reception module that receives a key operation by the user to the hardware key 22. Information (key data) of the hardware key that the user operates may be input to the processor 30.

The wireless communication circuit 32 may be a circuit for transmitting and receiving a radio wave for a telephone conversation, an e-mail, etc. In the embodiment, the wireless communication circuit 32 may be a circuit for performing a wireless communication in a CDMA system. If the user instructs an outgoing call (telephone call) by operating the input device 40, for example, the wireless communication circuit 32 performs telephone call processing under instructions of the processor 30 and outputs a telephone call signal via the antenna 34. The telephone call signal can be transmitted to a telephone at the other end of line through a base station and a communication network. Then, when incoming call processing is performed in the telephone at the other end of line, a communication-capable state can be established and the processor 30 can perform telephone conversation processing.

The microphone 20 shown in FIG. 1 may be connected to the A/D converter 36, and a voice signal from the microphone 20 can be converted into digital voice data by the A/D converter 36 to be input to the processor 30. On the other hand, the speaker 18 may be connected to the D/A converter 38. The D/A converter 38 can convert digital voice data into a voice signal to apply to the speaker 18 via an amplifier. Therefore, a voice of the voice data can be output from the speaker 18. Then, in a state where the telephone conversation processing is performed, a voice that is collected by the microphone 20 can be transmitted to the telephone at the other end of line, and a voice that is collected by the telephone at the other end of line can be output from the speaker 18.

The processor 30 can adjust, in response to an operation for adjusting a volume by the user, a voice volume of the voice output from the speaker 18 by controlling an amplification factor of the amplifier connected to the D/A converter 38.

The display driver 42 may be connected with the display 14, and therefore, the display driver 42 can display a video or image on the display 14 according to video or image data that is output from the processor 30. The display driver 42 may include a video memory that temporarily can store image data to be displayed, and data that is output from the processor 30 can be stored in this video memory. Then, the display driver 42 can display an image on the display 14 according to a content of the video memory. That is, the display driver 42 controls display by the display 14 connected to the display driver 42 under instructions of the processor 30.

The display 14 may be provided with a backlight that includes a light source of an LED or the like, for example, and the display driver 42 can control, according to the instructions from the processor 30, brightness, lighting/extinction of the backlight.

The touch panel 16 shown in FIG. 1 may be connected to the touch panel control circuit 48. The touch panel control circuit 48 can apply to the touch panel 16 a necessary voltage or the like and input to the processor 30 a touch start signal indicating a start of a touch by the user to the touch panel 16, a touch end signal indicating an end of a touch by the user, and coordinate data indicating a touch position that the user touches. Therefore, the processor 30 can determine the user touches to which object based on the coordinate data.

In the embodiment, the touch panel 16 may be of an electrostatic capacitance system that detects a change of an electrostatic capacitance between electrodes, which occurs when an object such as a finger is close to a surface of the touch panel 16. The touch panel 16 can detect that one or more fingers are brought into contact with the touch panel 16, for example. Therefore, the touch panel 16 may be also called a pointing device. The touch panel control circuit 48 can detect a touch operation within a touch-effective range of the touch panel 16, and output coordinate data indicative of a position of the touch operation to the processor 30. That is, the user can input an operation position, an operation direction and so on to the mobile phone 10 through a touch operation to the surface of the touch panel 16.

A tap operation, a long tap operation, a flick operation, a slide operation, etc. may be included in the touch operation of this embodiment.

The tap operation is an operation that a finger is brought into contact with the surface of the touch panel 16, and then, the finger is lifted (released) from the surface of the touch panel 16 within a short time. The long tap operation is an operation that a finger is continued to be brought into contact with the surface of the touch panel 16 for a predetermined time period or more, and then, the finger is released from the surface of the touch panel 16. The flick operation is an operation that a finger is brought into contact with the surface of the touch panel 16, and the finger is flicked in an arbitrary direction with a predetermined speed or more. The slide operation is an operation that a finger is moved in an arbitrary direction while being kept to be brought into contact with the surface of the touch panel 16, and then, the finger is released from the surface of the touch panel 16.

It should be noted that in the above-described slide operation, a slide operation that a finger is brought into contact with an object being displayed on the surface of the display 14 and moves the object, that is, a so-called drag operation is also included. An operation that a finger is released from the surface of the touch panel 16 after the drag operation is called a drop operation.

In the following description, there is an occasion that the touch operation, the long tap operation, the flick operation, the slide operation, the drag operation and the drop operation may be described with omitting the word "operation", respectively. Furthermore, a touch operation may be performed by a stylus pen, etc. not limited to a finger of the user.

The vibrator 50 may be a motor that an eccentric weight is attached to a rotation axis, and on/off thereof can be controlled by the processor 30. Then, if the vibrator 50 is turned on, the vibrator 50 vibrates, and therefore, the mobile phone 10 also vibrates.

The gyro sensor 52 may be used for detecting a motion of the mobile phone 10. For example, the gyro sensor 52 may be a piezoelectric type gyroscope, and can detect angular velocities of three (3) axes (x, y, z), and outputs a detection result to the processor 30. The processor 30 can detect a motion and/or an inclination of the mobile phone 10 based on the angular velocity of each axis that the gyro sensor 52 detects. Then, the processor 30 can control display direction of the display 14, etc. based on a detected motion.

Figure 3:
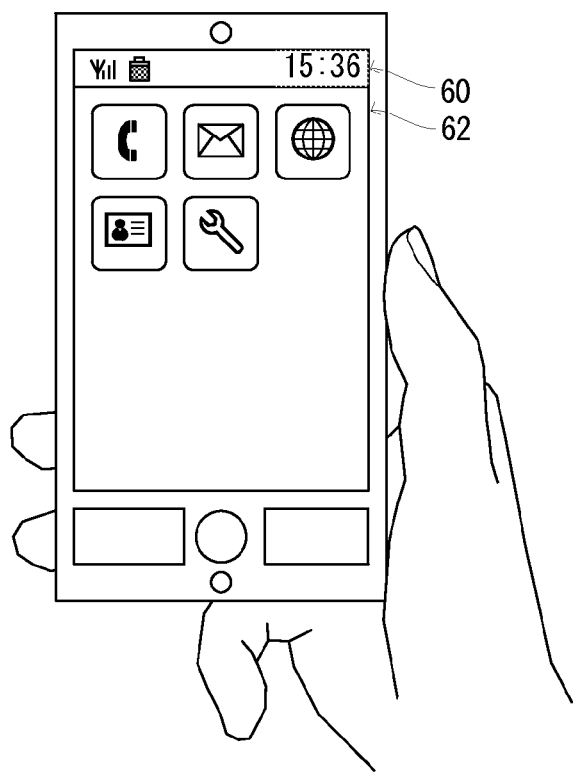
FIG. 3 is an illustration view showing an example of a state where FIG. 1 mobile phone is held by a user.

With reference to FIG. 3, the display 14 may include a status display area 60 and a function display area 62. In the status display area 60, an icon (picto) showing a radio-wave receiving status by the antenna 34, an icon showing a residual battery capacity of a secondary battery and a time are displayed. Furthermore, a home screen comprising a plurality of function icons is displayed in the function display area 62.

For example, the user can perform a function corresponding to a function icon if performing a touch operation to the function icon. Furthermore, when another home screen is set in addition to the home screen currently displayed, a user can change a home screen to be displayed by performing a slide operation (or a flick operation) in a horizontal direction.

Furthermore, as shown in FIG. 3, the mobile phone 10 is held in a manner that a lower side is fixed by the little finger of the right hand, a left side is fixed by the third finger and the middle finger, a rear side is fixed by the index finger (not shown) and a right side is fixed by the thumb. When the mobile phone 10 is thus held, a touch operation to the mobile phone 10 is mainly performed by the right thumb.

Here, in the holding manner shown in FIG. 3, it is impossible to perform a touch operation in an entire range of the touch panel 16 by only the right thumb. In order to perform a touch operation to a function icon displayed on an upper left, for example, the user who holds the mobile phone 10 as shown in FIG. 3 needs to perform a touch operation by a finger of the left hand or to change the holding manner by the right hand such that the thumb can reach the upper left icon.

However, when the user has a baggage or grasps a handrail by the hand (left hand) not holding the mobile phone 10, it is impossible to perform a touch operation by the hand not holding the mobile phone 10. Furthermore, when changing the holding manner of the right hand, it becomes difficult to perform a touch operation to a periphery of a root of the thumb, i.e., a lower right of the touch panel.

Then, the embodiment enables a user to operate the mobile phone 10 easily with a single hand by displaying a cursor CU that moves according to a touch operation on the display 14. In the following, generation (display) of the cursor CU and an operation to the cursor CU will be described specifically.

Figure 4:
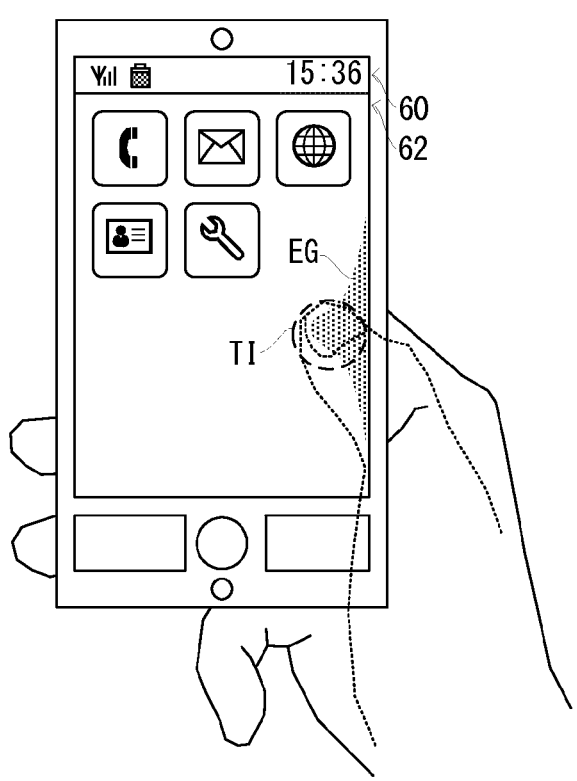
FIG. 4 is an illustration view showing an example of a state where a touch operation is performed to a touch panel shown in FIG. 1.

With reference to FIG. 4, when a touch operation is detected in an end portion of the touch panel 16, in order to indicate having received an operation for generating the cursor CU, a touch icon TI and an image effect (effect object) EG are displayed. In this embodiment, a detection area is established in a range of a predetermined distance (about 1.5 mm, for example) from a side of an end portion of the touch panel 16. Then, when a touch operation is performed to this detection area, it is determined that the end portion of the touch panel 16 is touched.

In order to clarify a position of the image effect EG and the touch icon TI, the thumb is illustrated in a transparent state in FIG. 4.

The touch icon TI shows a current touch position, and is processed such that transparency α1 (alpha 1) is changed with a predetermined period. Furthermore, the touch icon TI is displayed to indicate a touch position to a user, and displayed more largely than the finger that touches. However, if displaying in such a manner, a background is hidden by the touch icon TI, and it becomes hard for the user to grasp a periphery of a place being touched with the finger. Then, if changing the transparency α1 of the touch icon TI, when it is in a state where the transparency α1 is high, it becomes easy to grasp the background, and when it is in a state where the transparency α1 is low, it becomes easy to grasp the touch position. That is, it is possible to balance grasp of the touch position and grasp of the background by changing the transparency α1 of the touch icon TI. In order to clarify the image effect EG displayed on the background, a state of FIG. 4 is illustrated with the lowest transparency α1 of the touch icon TI.

Figure 5:
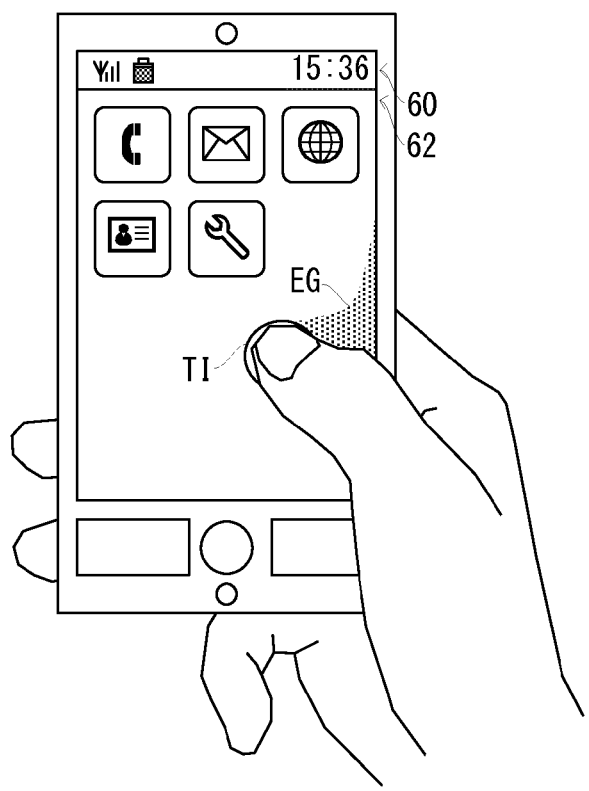
FIG. 5 is an illustration view showing another example of the state where a touch operation is performed to the touch panel shown in FIG. 1.

The image effect EG is displayed in a form of a mountain that makes the current touch position the top part from the end portion of the touch panel 16 (display 14) centering on a position that the end portion is touched. Then, if a touch position changes as shown in FIG. 5, the image effect EG changes while following the touch position. Then, by thus displaying the image effect EG, it is possible to give a user a feeling of operation when generating the cursor CU.

Figure 6:
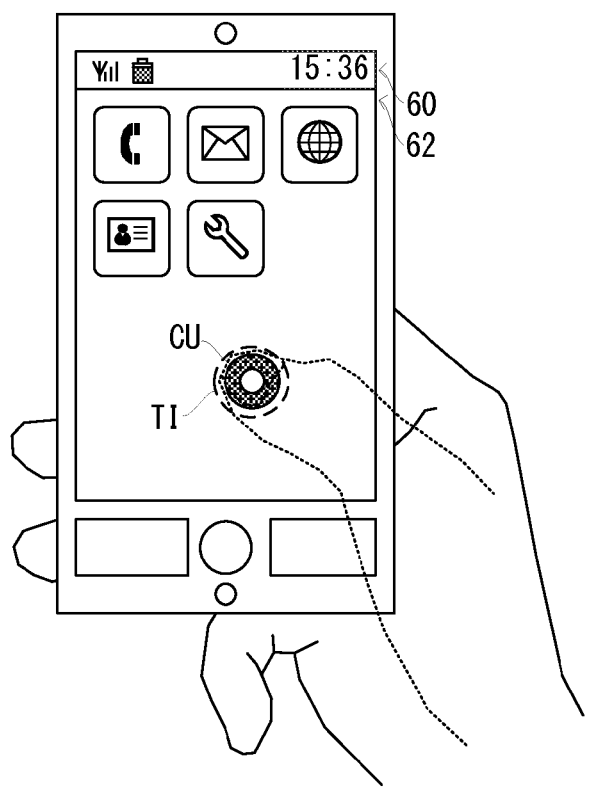
FIG. 6 is an illustration view showing an example of a state where a cursor is generated on a display shown in FIG. 1.

With reference to FIG. 6, when a distance between the touch position and the end portion of the touch panel 16 becomes larger than a first threshold value, the touch position at that time is set as an origin of the cursor CU (hereinafter, called a cursor origin), and the cursor CU is generated at the cursor origin. That is, as shown in FIG. 6, the cursor CU is displayed on the display 14 to put on the touch icon TI that indicates a current touch position.

Furthermore, if the cursor CU is generated, the display of the image effect EG is non-displayed, and a sound effect such as "POM" may be output from the speaker 18 and the vibrator 50 vibrates only for a predetermined time period. That is, the user can know that the cursor CU is generated by these actions. In order to clarify the positions of the cursor CU and the touch icon TI, the thumb is illustrated in a transparent state also in FIG. 6.

In this embodiment, since the cursor CU is not generated if a touch operation is not performed from the end portion of the touch panel 16, it is possible to distinguish an operation generating the cursor CU from other operations (for example, operation that changes a home screen).

Figures 7, 8:
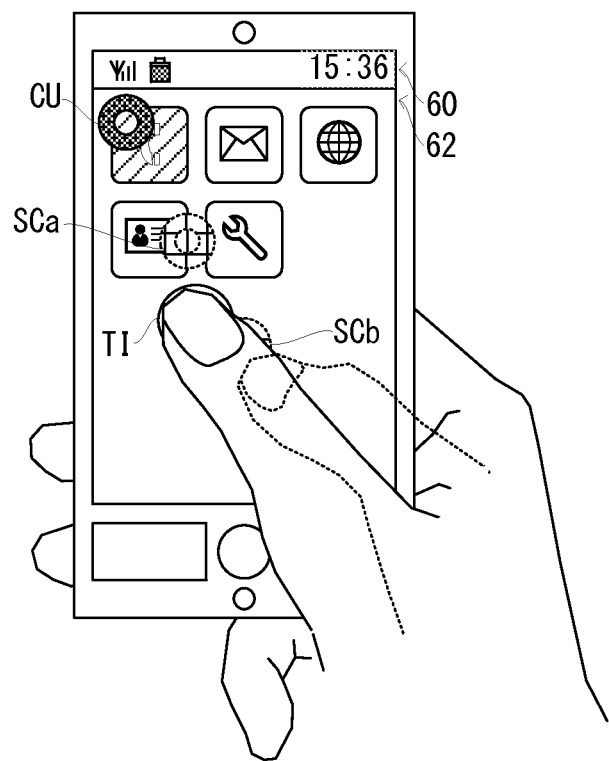
FIG. 7 is an illustration view showing an example of a state where the cursor shown in FIG. 6 is operated by a touch operation.
FIG. 8 is an illustration view showing an example of a format of a display position table that is stored in a RAM shown in FIG. 2.

Subsequently, a manner that the display of the cursor CU changes according to change of a touch position will be described. With reference to FIG. 7, the display position (coordinates) of the cursor CU is calculated based on a formula 1.

$$(x, y) = [a*(T_x - x_0), b*(T_y - y_0)]$$ [Formula 1]

wherein,
(x, y): display position
($x_0$, $y_0$): cursor origin
($T_x$, $T_y$): touch position
A, b: constants Specifically describing, in coordinates change of the touch position (Tx, Ty) with respect to the cursor origin (x0, y0), a coordinate position obtained by making coordinate change of an abscissa a first constant times (3 times, for example) and a coordinate change of an ordinate a second constant times (4 times, for example) is rendered as the display coordinates (x, y) of the cursor CU. Therefore, if the display coordinates is calculated based on the formula 1 when the touch position changes, the cursor CU becomes to be displayed at a position different from the touch position. That is, the user can operate the cursor CU that is displayed on a position apart from the touch position by performing a touch operation.

Next, with reference to FIG. 7, if an arbitrary function icon is selected by the cursor CU, a color of a selected function icon is reversed to notify the user a selected state by the cursor CU. The user can make selection of the function icon settle if a finger is released from the touch panel 16 in such a state. That is, arbitrary processing is performed based on a final position of the cursor CU at the time that the finger is released from the touch panel 16.

Here, when displaying the cursor CU on a position different from the touch position, there is a possibility that the user lose sight of the display position of the cursor CU. Then, in this embodiment, an afterimage object SC that indicates a last position of the cursor CU.

For example, an afterimage object SCa is displayed on the last position of the cursor CU, and an afterimage object SCb is displayed on a previous last position. Thus, it is possible to make the user hard to lose sight of the display position of the cursor CU by displaying a plurality of afterimage objects SC as a movement locus of the cursor CU. The number of the afterimage objects SC to be displayed may be one, and may be three or more.

With reference to FIG. 8, change of the display position of the cursor CU is recorded in a display position table in this embodiment. Then, the afterimage object SC is displayed based on the display position recorded on the display position table.

The display position table includes a column of number, a column of display position and a column of distance. Numerals are recorded in the column of number as a number becomes larger as the turn storing the display position becomes older. That is, the number assigned to the display position recorded at the last becomes smallest. Corresponding to the number, coordinates (xn, yn) are recorded in the column of display position. A distance Ln from the display position before one is recorded in the column of distance. Because the distance will be described later, a detailed description is omitted here.

Furthermore, the afterimage object SC is set to have a transparency α2 (alpha 2) that is lower than that of the cursor CU. That is, since the transparency α2 differs between the cursor CU and the afterimage object SC, the user can distinguish the cursor CU and the afterimage object SC from each other.

Furthermore, a plurality of afterimage objects SC are set such that the transparency α2 becomes high as it departs from the display position of the cursor CU. Specifically, a transparency correction value is set to each afterimage object SC. The transparency correction value is a value for correcting the transparency α2 of the afterimage object SC, and the transparency α2 of each afterimage object SC is a result that a corresponding transparency correction value is subtracted from the transparency α2 of the cursor CU. Then, this transparency correction value changes so as to become small according to the distance between the cursor CU and the afterimage object SC. Accordingly, the transparency α2 of the afterimage object SC becomes high as it departs from the display position of the cursor CU.

Figure 9:
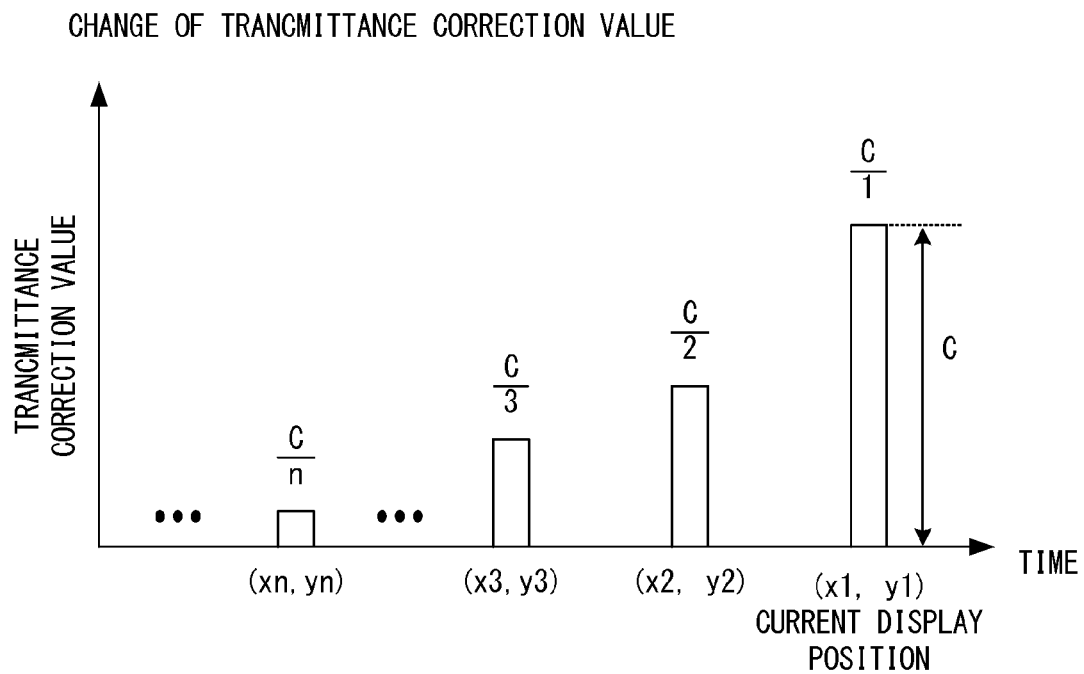
FIG. 9 is an illustration view showing an example of a transparency correction value corresponding to an afterimage object shown in FIG. 7.

For example, with reference to FIG. 9, the current display position of the cursor CU, i.e., the display position stored at the first of the display position table is (x1, y1), and the transparency correction value corresponding to the cursor CU is set to "C(=C/1)." Then, since the transparency correction value is set such that the transparency α2 of the cursor CU becomes a minimum value, the transparency α2 of the cursor CU is render minimum.

Next, the display position stored at the second, i.e., the last display position is (x2, y2), and the transparency correction value corresponding to the afterimage object SCa is set to "C/2." Then, the transparency α2 of the afterimage object SCa to be displayed on a position of the last time is rendered a value that "C/2" is subtracted from the transparency α2 of the cursor CU. That is, the transparency α2 of the afterimage object SCa to be displayed on the last display position becomes high 50% to the transparency α2 of the cursor CU.

Furthermore, since the display position stored at the third, i.e., the previous last display position is (x3, y3), a transparency correction value is set to "C/3." Therefore, the transparency α2 of the afterimage object SCb to be displayed on the display position of the previous last time becomes further higher.

Furthermore, a transparency correction value corresponding to the afterimage object SC to be displayed on the n-th display position (xn, yn) is set to "C/n", and the transparency α2 that is corrected by this transparency correction value is rendered a transparency α2 of the corresponding afterimage object SC. Then, since a value of n becomes larger as a stored display position is older, a transparency correction value becomes smaller as departing from the cursor CU.

Thus, since the transparency α2 of the afterimage object SC becomes high as it departs from the cursor CU, the visibility of the display 14 is prevented from falling even if a plurality of afterimage objects SC are displayed.

Figure 10:
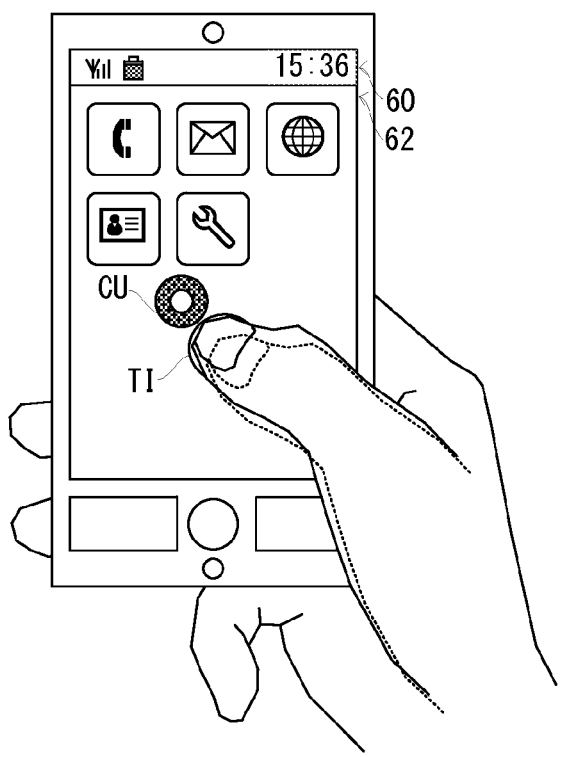
FIG. 10 is an illustration view showing another example of a state where the cursor shown in FIG. 6 is operated by a touch operation.

Here, since the responsivity of the touch panel 16 is set high, a slight motion of a finger may be detected even if a user does not have an intention to move the finger, and therefore, a cursor may move slightly against a user's intention. Then, when a moving amount of the cursor CU is small, the afterimage object SC is displayed around the cursor CU, and it becomes difficult for the user to identify the display position of the cursor CU. Then, when the moving amount of the cursor CU is little, the afterimage object SC is made not to be displayed as shown in FIG. 10.

For example, the distance Ln between the current display position (xn, yn) and the last display position (xn+1, yn+1) is calculated by a formula 2. When the calculated distance Ln is smaller than a threshold value L0 (second threshold value), the afterimage object SC is not displayed on the last display position.

$$L_0 = \sqrt{(x_{n-1}-x_n)^2 + (y_{n-1}-y_n)^2}$$ [Formula 2]

wherein
($x_n$, $y_n$): current display position
($x_{n-1}$, $y_{n-1}$): last display position Furthermore, about other afterimage objects SC, if the distance L from the display position before one is not larger than the threshold value L0 (second threshold value), the afterimage object SC is not displayed also on the display position before one.

Thus, the locus of the cursor CU is shown by the afterimage object SC when the moving amount of the cursor CU is large, but the afterimage object SC is made not to be displayed when the moving amount of the cursor CU is small, and accordingly, it is possible to make the user's operability in operating the cursor CU improve.

In order to prevent a wrong operation, when an inclination of the display 14 (mobile phone 10) is not included within a permissible range, the cursor CU is made not to be generated.

Furthermore, in this embodiment, although the display position of the cursor CU is calculated using above-described formula, a touch position may be converted into the display position of the cursor CU using a conversion map in consideration of a motion of a finger.

Furthermore, in other embodiments, it may be determined whether a distance between the touch position and the end portion of the touch panel 16 is larger than the first threshold value based on a slide amount after the end portion of the touch panel 16 is touched.

Furthermore, in the other embodiments, not the transparency α1 of the touch icon TI but a size (area) of display of the touch icon TI may be changed.

The feature of the embodiment is outlined in the above. In the following, the embodiment will be described in detail using a memory map shown in FIG. 11 and flowcharts shown in FIG. 12 to FIG. 15.

Figure 11:
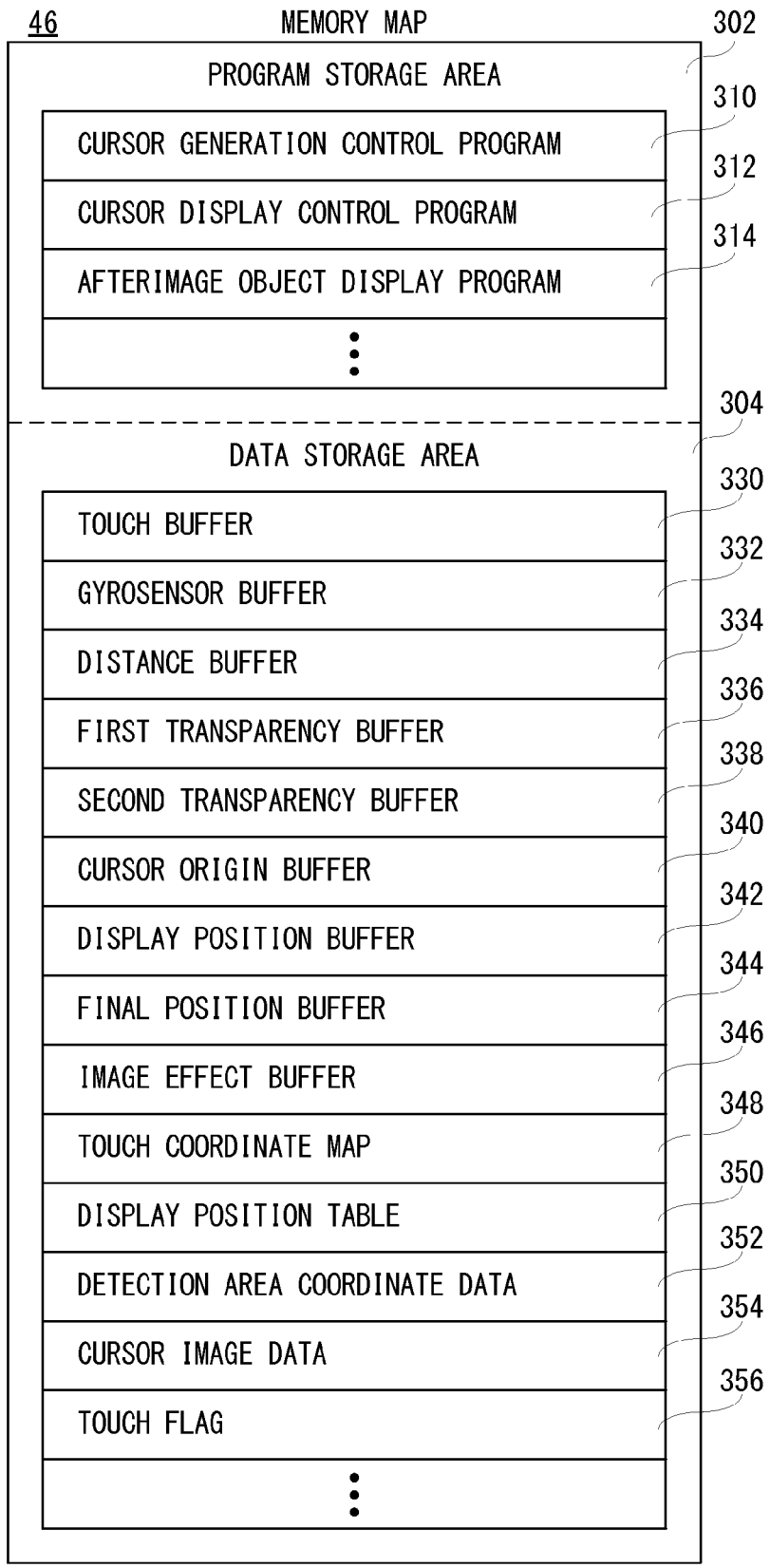
FIG. 11 is an illustration view showing an example of a memory map of the RAM shown in FIG. 2.

With reference to FIG. 11, a program storage area 302 and a data storage area 304 are formed in the RAM 46. The program storage area 302 is an area for reading and storing (developing) a whole or part of program data that is set in advance in the flash memory 44 (FIG. 2), as described previously.

The program storage area 302 includes a cursor generation control program 310 for controlling generation of a cursor CU, a cursor display control program 312 for controlling a display position of the cursor Cu, an afterimage object display program 314 for displaying an afterimage object SC, etc.

The programs for performing an e-mail application, an alarm application, etc. are also included in the program storage area 302.

The data storage area 304 of the RAM46 is provided with a touch buffer 330, a gyro sensor buffer 332, a distance buffer 334, a first transparency buffer 336, a second transparency buffer 338, a cursor origin buffer 340, a display position buffer 342, a final position buffer 344, an image effect buffer 346, etc. Furthermore, the data storage area 304 is stored with a touch coordinate map 348, a display position table 350, detection area coordinate data 352, cursor image data 354, etc., and is provided with a touch flag 356, etc.

The touch buffer 330 is stored with touch coordinate data that is output from the touch panel control circuit 48. In the gyro sensor buffer 332, information on an angular velocity that is output from the gyro sensor 52 is stored temporarily. In the distance buffer 334, a distance from the end portion of the touch panel 16 to the current touch position is stored temporarily when the image effect EG is currently displayed. In the first transparency buffer 336, the transparency α1 for the touch icon TI is stored temporarily. In the second transparency buffer 338, the transparency α2 for the cursor CU and the afterimage object SC is stored temporarily.

In the cursor origin buffer 340, a cursor origin is stored temporarily. In the display position buffer 342, a current display position of the cursor CU is stored temporarily. In the final position buffer 344, the display position of the cursor CU when a touch operation is ended is stored. The image effect buffer 346 is temporarily stored with image data that indicates the image effect EG to be displayed when the end portion of the touch panel 16 is touched.

The touch coordinate map 348 is data for mapping the touch coordinate in the touch operation with the display coordinates of the display 14 to each other. That is, a result of the touch operation performed to the touch panel 16 is reflected in the display on the display 14 based on the touch coordinate map 348.

The display position table 350 is table data of a format shown in FIG. 8, for example. The detection area coordinate data 352 is coordinate data that indicates a detection area that is set in the end portion of the touch panel 16. The cursor image data 354 is image data for displaying the cursor CU.

The touch flag 356 is a flag for determining whether a touch is being performed to the touch panel 16. The touch flag 356 is constructed by a 1-bit register, for example. If the touch flag 356 is turned on (true), a data value "1" is set in the register. On the other hand, if the touch flag 356 is turned off (false), a data value "0" is set in the register. Furthermore, the touch flag 356 is switched to on or off based on an output of the touch panel control circuit 48.

The data storage area 304 is stored with other data necessary for execution of the control program, and provided with other flags, timers (counters) necessary for execution of the control program.

Figure 12:
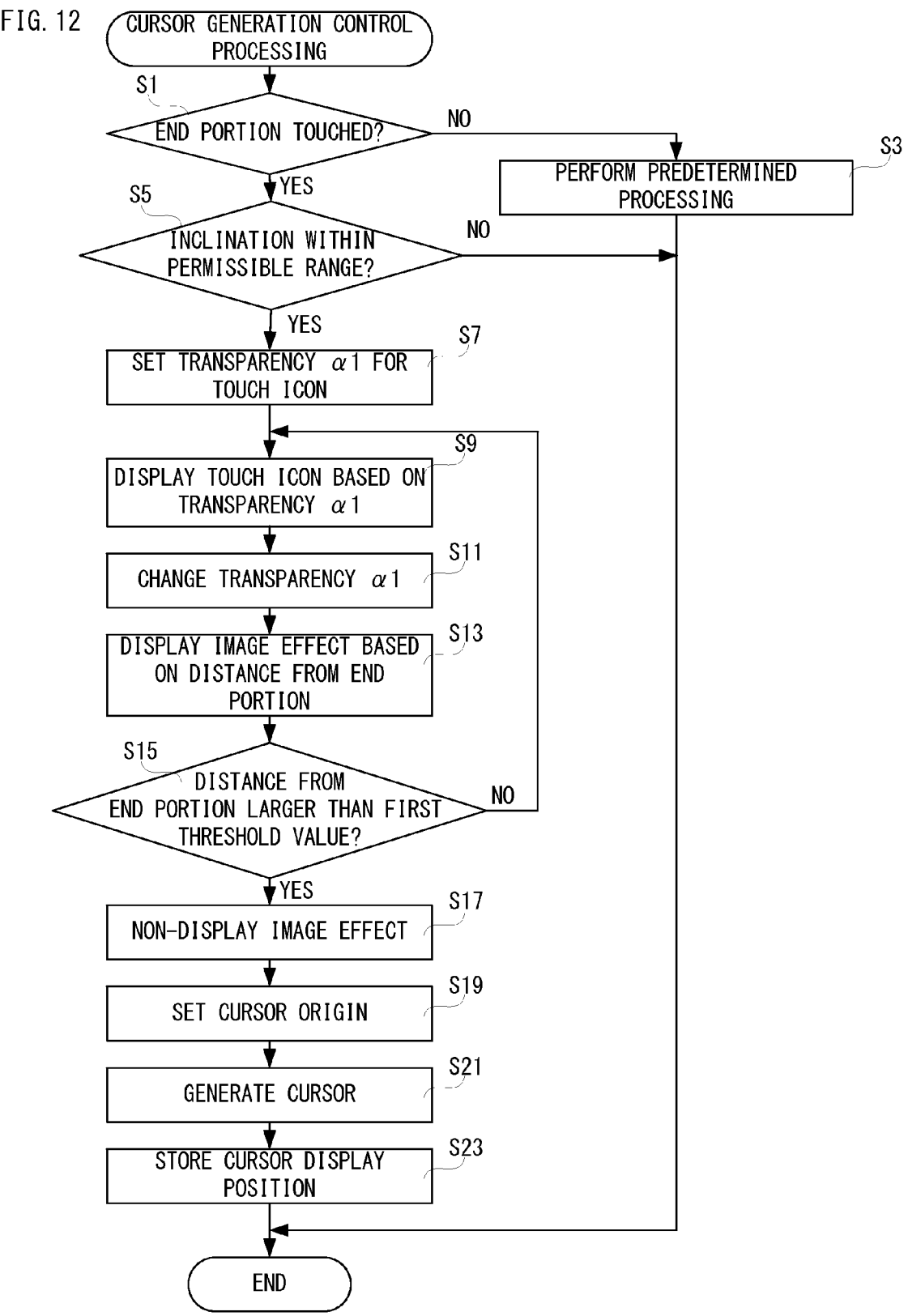
FIG. 12 is a flowchart showing an example of cursor generation control processing by a processor shown in FIG. 2.
Figure 13:
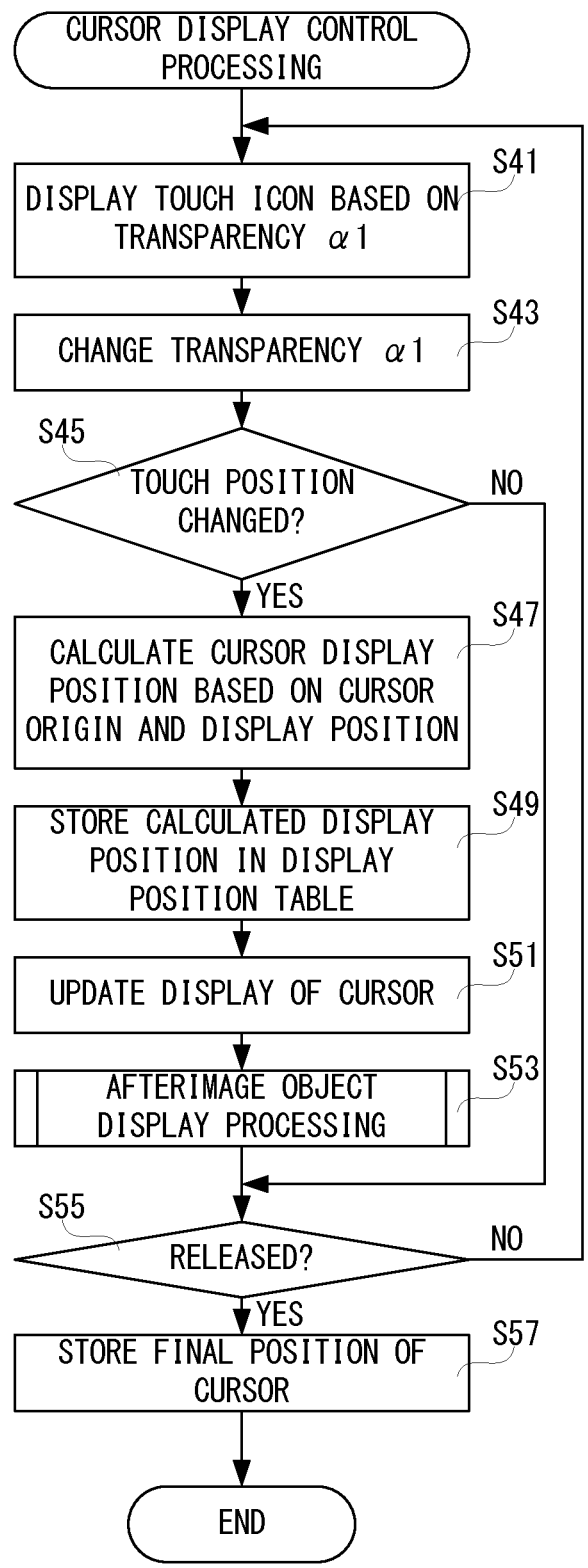
FIG. 13 is a flowchart showing an example of cursor display control processing by the processor shown in FIG. 2.
Figure 14:
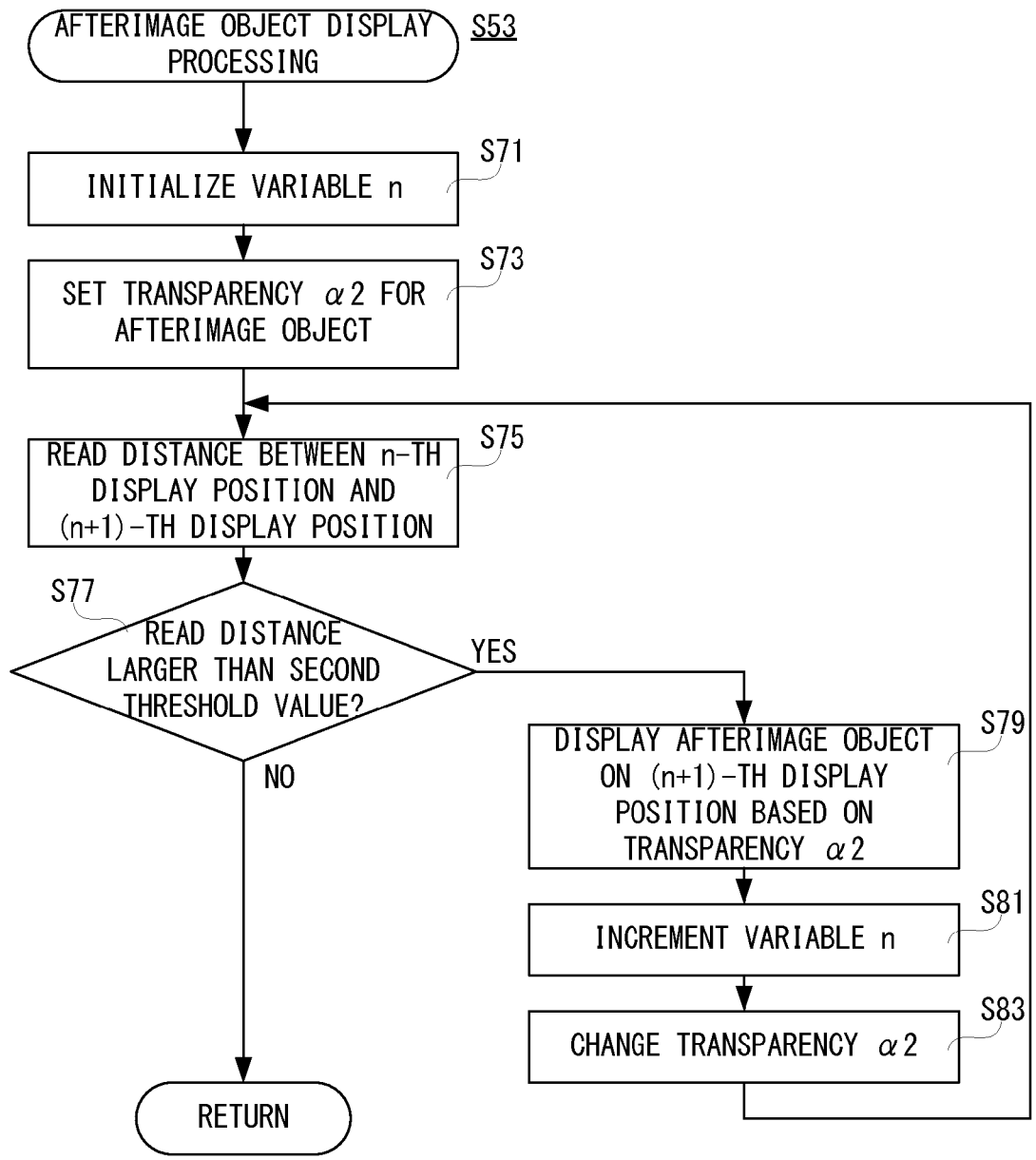
FIG. 14 is a flowchart showing an example of afterimage object display processing by the processor shown in FIG. 2.

The processor 30 processes a plurality of tasks including cursor generation control processing shown in FIG. 12, cursor display control processing shown in FIG. 13, after-image object display processing shown in FIG. 14, etc. in parallel with each other under controls of Linux (registered trademark)-base OS such as Android (registered trademark) and REX, or other OSs.

The cursor generation control processing is started when a touch operation is performed to the touch panel 16 and the touch flag 356 is turned on. The processor 30 determines, in a step S1, whether an end portion of the touch panel 16 is touched. That is, the processor 30 determines whether a touch position that is stored in the touch buffer 330 is included in a detection area that is indicated by the detection area coordinate data 352. The processor 30 that performs the processing of the step S1 functions as a determination module or a first determination module.

If "NO" is determined in the step S1, that is, if the end portion of the touch panel 16 is not touched, the processor 30 performs predetermined processing in a step S3. For example, if a function icon is touched, processing corresponding to the function icon is performed, and if a touch operation for changing a home screen is performed, processing changing a home screen is performed.

On the other hand, if "YES" is determined in the step S1, that is, the end portion of the touch panel 16 is touched, for example, the processor 30 determines, in a step S5, whether an inclination is within a permissible range. That is, it is determined whether an inclination (angle) of the display 14 (mobile phone 10) obtained from an output of the gyro sensor 52 is within an angle range that indicates a permissible range. If "NO" is determined in the step S5, that is, if the inclination (angle) is out of the permissible range, in order to prevent a wrong operation, the processor 30 terminates the cursor generation control processing.

If "YES" is determined in the step S5, that is, if the inclination (angle) is within the permissible range, the processor 30 sets the transparency α1 of the touch icon TI in a step S7. That is, in order to change a display manner of the touch icon TI, the transparency α1 of the touch icon TI is set. Furthermore, the transparency α1 that is set is stored in the first transparency buffer 336.

Subsequently, the processor 30 displays the touch icon TI in a step S9 based on the transparency α1. That is, the touch icon TI that indicates the touch position that is stored in the touch buffer 330 is displayed based on the transparency α1 that is stored in the first transparency buffer 336. Subsequently, the processor 30 changes the transparency α1 in a step S11. For example, it is changed such that the transparency α1 of the touch icon TI becomes high. It should be noted that it is changed such that the transparency α1 becomes low after the transparency α1 reaches a maximum value, and it is changed such that the transparency α1 becomes high again after the transparency α1 reaches a minimum value. Then, the transparency α1 after change is stored in the first transparency buffer 336. The processor 30 that performs the processing of the step S9 and step S11 functions as an icon display module.

Subsequently, the processor 30 displays the image effect EG in a step S13 based on a distance from the end portion. For example, in the step S13, a distance from the end portion of the touch panel 16 to the current touch position stored in the distance buffer 334 is read, and data of the image effect EG produced based on the distance is stored in the image effect buffer 346. Then, the processor 30 displays the image effect EG as shown in FIG. 4, for example on the display 14 based on the image data stored in the image effect buffer 346. The processor 30 that performs the processing of the step S13 functions as an effect object display module.

Subsequently, the processor 30 determines, in a step S15, whether the distance from the end portion is larger than a first threshold value. That is, it is determined whether the shortest distance between the end portion of the touch panel 16 and the touch position becomes larger than the first threshold value as a result of a slide of the finger that touches the end portion of the touch panel 16. Specifically, the processor 30 determines whether a value stored in the distance buffer 334 is larger than the first threshold value. The processor 30 that performs the processing of the step S15 functions as a second determination module.

If "NO" is determined in the step S15, that is, if the finger that touches the end portion of the touch panel 16 does not almost move, for example, the processor 30 returns to the processing of the step S9. That is, since the processing of the steps S9-S13 is repeated while it continues being determined as "NO" in the step S15, a display manner of the touch icon TI changes periodically, and the display of the image effect EG changes while following the touch position.

On the other hand, if "YES" is determined in the step S15, that is, if the shortest distance between the end portion of the touch panel 16 and the touch position becomes larger than the first threshold value, the processor 30 non-displays the image effect EG in a step S17. That is, the image data stored in the image effect buffer 346 is deleted, and the image effect EG displayed on the display 14 is non-displayed. Furthermore, a sound effect is output and the vibrator 50 vibrates in conjunction with the processing of the step S17. The processor 30 that performs the processing of the step S17 functions as a non-display module.

Subsequently, the processor 30 sets a cursor origin in a step S19. For example, the processor 30 reads the current touch position from the touch buffer 330, and makes the read touch position be stored in the cursor origin buffer 340. That is, a touch position at the time that the shortest distance between the current touch position and the end portion of the touch panel 16 becomes larger than the first threshold value is set as a cursor origin.

Subsequently, the processor 30 generates the cursor CU in a step S21. That is, the processor 30 displays image data of the cursor image data 354 based on the coordinate that is stored in the cursor origin buffer 340. As a result, as shown in FIG. 6, the cursor CU is displayed on the display 14. The processor 30 that performs the processing of the step S21 functions as a generation module.

Subsequently, the processor 30 stores the display position of the cursor CU in a step S23. That is, the cursor origin is recorded in the display position table 350. Then, if the processing of the step S23 is ended, the processor 30 terminates the cursor generation control processing.

The cursor display control processing of FIG. 13 is started if the cursor CU is displayed on the display 14. The processor 30 displays the touch icon TI based on the transparency α1 in a step S41 like the step S9. Furthermore, the processor 30 changes the transparency α1 in a step S43 like the step S11. The processor 30 that performs the processing of the step S41 and step S43 functions as an icon display module.

Subsequently, the processor 30 determines whether the touch position changes in a step S45. That is, it is determined whether the coordinate of the touch position stored in the touch buffer 330 changes. If "NO" is determined in the step S45, that is, if the touch position does not change, the processor 30 proceeds to processing of a step S55.

If "YES" is determined in the step S45, that is, if the touch position changes due to the movement of the finger of the user, for example, the processor 30 calculates, in a step S47, a display position of the cursor CU based on the cursor origin and the touch position. That is, the processor 30 reads the cursor origin (x0, y0) from the cursor origin buffer 340, and reads the touch position (Tx, Ty) after change from the touch buffer 330, and calculates based on the formula 1 a display position (x, y) of the cursor CU. Then, the calculated display position is stored in the display position buffer 342. The processor 30 that performs the processing of the step S47 functions as a calculation module.

Subsequently, the processor 30 makes the calculated display position be stored in the display position table 350 in a step S49. That is, the display position is stored in the display position table 350 such that the number of the calculated display position is set to "1." Furthermore, when storing the display position, a distance L1 from the last display position is calculated, and the calculated distance is also stored in the display position table 350. The processor 30 that performs the processing of the step S49 functions as a storing module.

Subsequently, the processor 30 updates the display of the cursor CU in a step S51. That is, the processor 30 updates the position that the cursor CU is displayed based on the display position stored in the display position buffer 342. The processor 30 that performs the processing of the step S51 functions as an update module.

Subsequently, the processor 30 performs the afterimage object display processing in a step S53. Because this afterimage object display processing will be described in detail using a flowchart showing in FIG. 14, a description is omitted here.

Subsequently, the processor 30 determines, in a step S55, whether the finger is released. That is, it is determined whether the user releases the finger from the touch panel 16 and thus the touch flag 356 is turned off. If "NO" is determined in the step S55, that is, if the touch panel 16 is still being touched, the processor 30 returns to the processing of the step S41.

Furthermore, if "YES" is determined in the step S55, that is, if the finger is released from the touch panel 16, the processor 30 stores a final position of the cursor CU in a step S57. That is, the display position stored in the display position buffer 342 is stored in the final position buffer 344. For example, when the display position (coordinate) stored in the display position buffer 342 is included within a display range of a function icon, the processor 30 performs processing corresponding to the function icon. If the processing of the step S57 is ended, the processor 30 terminates the cursor display control processing.

The afterimage object display processing of FIG. 14 is started when the step S53 in the cursor display control processing is performed. The processor 30 initializes a variable n in a step S71. That is, in order to designate the display position stored in the display position table 350, the variable n is initialized. Subsequently, the processor 30 sets a transparency α2 of the afterimage object SC in a step S73. That is, the transparency α2 of a first afterimage object SCa is stored in the second transparency buffer 338. Furthermore, the transparency α2 of the afterimage object SCa is a value that is corrected by the transparency correction value "C/2" shown in FIG. 9. The processor 30 that performs the processing of the step S73 functions as a setting module.

Subsequently, the processor 30 reads a distance Ln between the n-th and (n+1)-th display positions in a step S75. For example, if the variable n is "1", the distance L1 between the current display position (x1, y1) and the last display position (x2, x2) is read.

Subsequently, the processor 30 determines, in a step S77, whether the read distance Ln is larger than the second threshold value (threshold value L0). The processor 30 that performs the processing of the step S77 functions as a distance determination module.

If "YES" is determined in the step S77, that is, if the read distance L1 is larger than the second threshold value because change of the touch position is large as shown in FIG. 7, for example, the processor 30 displays an afterimage object SC on the (n+1)-th display position in a step S79 based on the transparency α2. For example, if the variable n is "1", the afterimage object SCa (see FIG. 7) is displayed on the last display position. The processor 30 that performs the processing of the step S79 functions as an object display module.

Subsequently, the processor 30 increments the variable n in a step S81. That is, in order to determine whether it is necessary to display a next afterimage object SC, the variable n is incremented.

Subsequently, the processor 30 changes the transparency α2 in a step S83. That is, the transparency α2 is changed such that the transparency α2 for a next afterimage object SC becomes high. Then, a changed result is stored in the second transparency buffer 338. Then, if the processing of the step S83 is ended, the processor 30 returns to the processing of the step S75.

On the other hand, if "NO" is determined in the step S77, that is, if the read distance L1 is smaller than the second threshold value because the change of the touch position is small as shown in FIG. 10, for example, the processor 30 terminates the afterimage object display processing, and then, returns to the cursor display control processing. That is, since the change of the touch position is small and the moving amount of the cursor CU is small, the afterimage object SC is not displayed.

The detection area for detecting a touch of the end portion of the touch panel 16 is established not only in a right side of the touch panel 16 but in a left side. Therefore, if the mobile phone 10 is held with the left hand and a touch operation is detected in the detection area provided in the left end portion of the touch panel 16, the image effect EG and the touch icon TI that right and left is reversed to state shown in FIG. 4 are displayed on the display 14.

Furthermore, a holding manner of the mobile phone 10 shown in FIG. 3 etc. is merely an example, and the mobile phone 10 may be held with the left hand, or may be held with both hands.

Furthermore, the cursor CU of other embodiments may be an arrow mark etc. Furthermore, the afterimage object SC may be a figure different from the cursor CU.

Furthermore, although a word "larger" is used to the threshold value in the above-described embodiment, a meaning "equal to or more than a threshold value" is also included in an expression "larger than a threshold value." Furthermore, an expression "not larger than a threshold value" can be replace with an expression "smaller than a threshold value", and meanings of "equal to or less than a threshold value" and "less than a threshold value" are included in these expressions.

The programs used in the embodiments may be stored in an HDD of the server for data distribution, and distributed to the mobile phone 10 via the network. Furthermore, a plurality of programs may be stored in a storage medium such as an optical disk of CD, DVD, BD (Blu-ray Disc) or the like, a USB memory, a memory card, etc., and then, such the storage medium may be sold or distributed. In a case where the programs downloaded via the above-described server or storage medium are installed to a portable terminal having the structure equal to the structure of the embodiments, it is possible to obtain advantages equal to the advantages according to the embodiments.

The specific numerical values described in this specification are only examples, and changeable appropriately in accordance with the change of product specifications.

It should be noted that reference numerals inside the parentheses and the supplements show an example of a corresponding relationship with the embodiments described above for easy understanding of the disclosure, and do not limit the disclosure.

An embodiment is a mobile terminal having a touch panel and a display module that is provided with the touch panel, and displays a cursor that moves according to a touch operation, comprising: a calculation module operable to calculate, when a touch position is changed, a display position of the cursor based on the touch position after change; a storing module operable to store the display position calculated by the calculation module; an update module operable to update display of the cursor based on the display position calculated by the calculation module; a distance determination module operable to determine, when the touch position is changed, whether a distance between a last display position that is stored by the storing module and a current display position is larger than a threshold value; and a display module operable to display, when it is determined that the distance between the last display position and the current display position is larger than the threshold value, an object that indicates a last position of the cursor at the last display position, wherein the display module operable not to display the object when it is not determined that the distance between the last display position and the current display position is larger than the threshold value.

In the embodiment, the portable terminal (10: reference numeral exemplifying a portion or module corresponding in the embodiment, and so forth) has the display module (14) that is provided with the touch panel (16). A cursor (CU) that moves according to a touch operation to the touch panel is displayed on the display module. If a touch position changes by the touch operation, the calculation module (30, S47) calculates a display position of the cursor based on the touch position after change. The storing module (30, S49) stores a calculated display position to a table (350) that is stored in a RAM (46), for example. The update module (30, S51) updates a position that a cursor is to be displayed based on the calculated display position. When the touch position changes by the touch operation as described above, the distance determination module (30, S77) determines whether a distance between a last display position stored in the table by the storing module, for example and a current display position is larger than a threshold value (second threshold value: threshold value L0). When the distance of the last display position and the current display position is larger than the threshold value, the object display module (30, S79) displays an object (SC) that indicates the last position of the cursor on the last display position, for example. On the other hand, when the distance of the last display position and the current display position is not larger than the threshold value, an object is not displayed on the last position of a cursor.

According to this embodiment, when a moving amount of the cursor is large, the last position of the cursor is indicated by the object, and when a moving amount of the cursor is small, the object is not displayed, whereby a user's operability in operating the cursor can be improved.

Another embodiment further comprises a setting module operable to set transparency of the object, wherein the object display module displays the object based on the transparency.

In this embodiment, the setting module (30, S73) sets transparency ($\alpha 2$) for the object such that transparency of the object becomes high than that of the cursor, for example. Then, the object display module displays the object based on the transparency that is thus set.

According to this embodiment, since the transparency differs between the cursor and the object, it becomes easy for a user to distinguish the cursor and the object from each other.

In a further embodiment, a plurality of display positions are stored by the storing module, and the object display module displays an object on each of the plurality of display positions when it is determined that each distance among the plurality of display positions stored by the storing module is larger than the threshold value.

In the further embodiment, a plurality of display positions are stored in the table that is stored in the RAM, for example. If it is determined that a distance of each of the plurality of display positions is larger than the threshold value, for example, the object is displayed on each of the plurality of display positions. That is, a moving locus of the cursor is indicated by the plurality of objects.

According to the further embodiment, it is possible to make the user hard to lose sight of the display position of the cursor by displaying the plurality of objects as the moving locus of the cursor.

A still further embodiment further comprises a change module operable to change transparencies of the plurality of objects such that the objects have different transparencies.

In the still further embodiment, the change module (30, S83) changes the transparencies of the plurality of objects in a manner that the transparency becomes high as the object departs from the display position of the cursor.

According to the still further embodiment, since the transparency of the object becomes high as it departs from the cursor, even if a plurality of objects are displayed, the visibility of the display is prevented from falling.

A yet further embodiment further comprises an icon display module operable to display on the current touch position an icon that a display manner changes with a predetermined period.

In the yet further embodiment, the icon display module (30, S41, S43) displays the icon (TI) that the transparency ($\alpha 1$) or a size of display change with the predetermined period according to the current touch position, for example.

According to the yet further embodiment, it is possible to balance grasp of the touch position and grasp of the background by changing the display manner of the icon.

The other embodiment is a cursor display control method in a mobile terminal (10) having a touch panel (16) and a display module (14) that is provided with the touch panel, and displays a cursor (CU) that moves according to a touch operation, wherein a processor(s) of the mobile terminal performs: calculating (S47), when a touch position is changed, a display position of the cursor based on the touch position after change; storing (S49) the display position calculated by the calculating step; updating (S51) display of the cursor based on the display position calculated in the calculating step; determining (S77), when the touch position is changed, whether a distance between a last display position that is stored in the storing step and a current display position is larger than a threshold value; and displaying (S79), when it is determined that the distance between the last display position and the current display position is larger than the threshold value, an object that indicates a last position of the cursor at the last display position, wherein the displaying step does not display the object when it is not determined that the distance between the last display position and the current display position is larger than the threshold value.

In the other embodiment, when a moving amount of the cursor is large, the last position of the cursor is indicated by the object, and when a moving amount of the cursor is small, the object is not displayed, whereby a user's operability in operating the cursor can be improved.

Although the present disclosure has been described and illustrated in detail, it is clearly understood that the same is by way of illustrative and example only and is not to be taken by way of limitation, the spirit and scope of the present disclosure being limited only by the terms of the appended claim.

What is claimed is:

1. A mobile terminal comprising:
   a touch panel display which displays a cursor that moves according to a touch operation; and
   at least one processor that is configured to, when a touch position of the touch operation is changed,
     store a past display position of the cursor prior to the change,
     calculate a new display position of the cursor based on the touch position after the change,
     move the cursor to the new display position,
     determine whether a distance of the touch position from a reference position is larger than a threshold value,
     when the distance is determined to be larger than the threshold value, display an object at the past display position of the cursor simultaneously with the display of the cursor at the new display position, and,
     when the distance is determined not to be larger than the threshold value, not display the object.

2. The mobile terminal according to claim 1, wherein the object has a set transparency when displayed.

3. The mobile terminal according to claim 1, wherein the at least one processor is configured to:
   store a plurality of past display positions of the cursor; and,
   when the distance is determined to be larger than the threshold value, display an object at each of the plurality of past display positions of the cursor simultaneously with the display of the cursor at the new display position.

4. The mobile terminal according to claim 3, wherein each object that is displayed at one of the plurality of past display positions is displayed with a different transparency than the other objects displayed at one of the plurality of past display positions.

5. The mobile terminal according to claim 4, wherein the transparencies of the displayed objects increase as a distance of the displayed objects from the new display position of the cursor increases.

6. The mobile terminal according to claim 1, wherein the at least one processor is further configured to display an icon at the touch position of the touch operation, a display manner of the icon changing according to a predetermined period.

7. The mobile terminal according to claim 6, wherein the at least one processor displays the icon simultaneously with the display of the object at the past display position of the cursor and the display of the cursor at the new display position.

8. The mobile terminal according to claim 1, wherein calculating a new display position of the cursor based on the touch position after the change comprises:
   multiplying a first distance between a first coordinate of the touch position and a first coordinate of the reference position by a first coefficient;
   multiplying a second distance between a second coordinate of the touch position and a second coordinate of the reference position by a second coefficient;
   determining a first coordinate of the new display position based on a product of the first distance and the first coefficient; and
   determining a second coordinate of the new display position based on a product of the second distance and the second coefficient.

9. A cursor display control method in a mobile terminal comprising a touch panel display which displays a cursor that moves according to a touch operation, wherein at least one processor of the mobile terminal performs, when a touch position of the touch operation is changed:
   storing a past display position of the cursor prior to the change;
   calculating a new display position of the cursor based on the touch position after the change;
   moving the cursor to the new display position;
   determining whether a distance of the touch position from a reference position is larger than a threshold value;
   when the distance is determined to be larger than the threshold value, displaying an object at the past display position of the cursor simultaneously with the display of the cursor at the new display position; and,
   when the distance is determined not to be larger than the threshold value, not displaying the object.

* * * * *